Feb. 17, 1931.  V. MONROE  1,793,117
FISHING TOOL
Filed Dec. 5, 1929
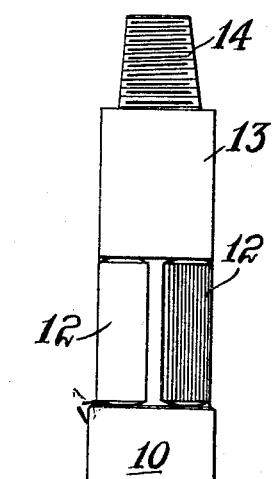
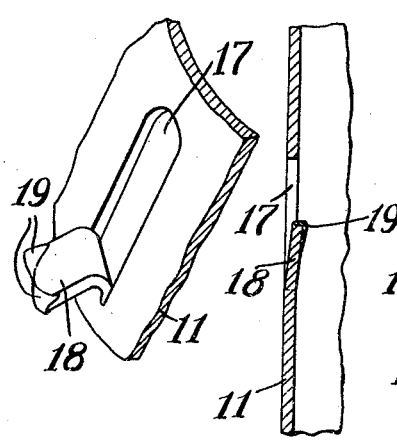
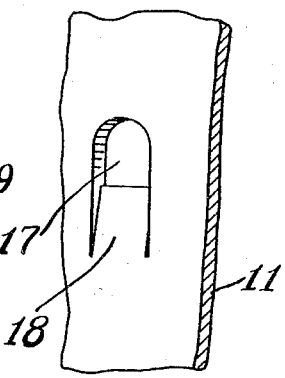
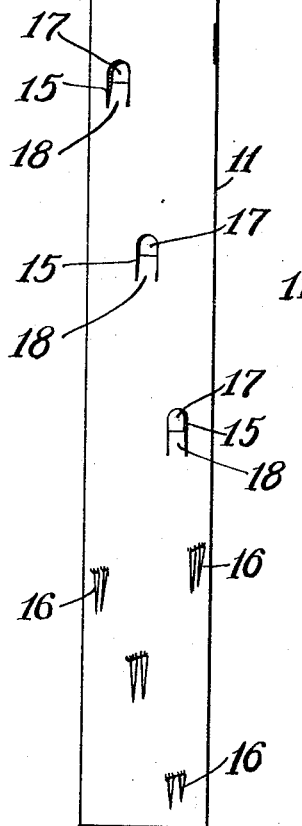
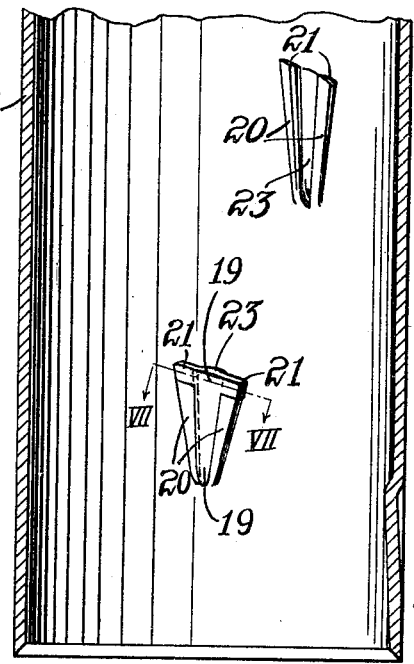
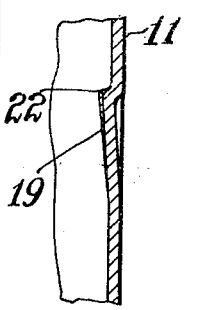
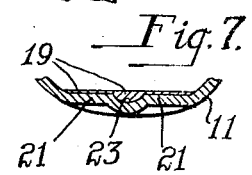
INVENTOR
Verne Monroe
By Green & McCallister
His Attorneys Patented Feb. 17, 1931

1,793,117

UNITED STATES PATENT OFFICE

VERNE MONROE, OF CAMERON, WEST VIRGINIA

FISHING TOOL

Application filed December 5, 1929. Serial No. 411,948.

This invention relates to fishing tools for retrieving other tools from well holes and particularly to a hollow cylindrical fishing tool designed to slip over the tool to be retrieved and to engage the same so that the latter may be raised to the surface of the well.

Many previous attempts have been made to devise a satisfactory and efficient fishing tool, but so far without a complete fulfillment of the desired result. In drilling practice, as the well is deepened its diameter is reduced, but the diameter of the tools used do not decrease at the same ratio. The result of this is that whereas in the larger upper portions of the well hole comparatively thick fishing tools or sockets can be used which permit the insertion of hard metal slips bearing on and supported by tapered seats, in the lower and smaller portions of the well hole there is a very limited space between the well hole wall and the lost tools. It is not deemed necessary to go into details concerning the lost tools themselves as the conditions under which they are lost are well known in the industry and the losses have been a constant and expensive hindrance in the practical drilling of wells.

Thus, when tools are lost in the lower and smaller parts of the well hole, it is imperative to use a thin walled fishing tool or socket which is lowered over the lost tools and which has heretofore held the same by frictional engagement. If the lost tools are stuck in the hole the frictional hold is easily broken and it is then necessary to drill past the tools to loosen them or to mill a pin which reduces the diameter of the upper end of the tools so that a heavy wall socket may be used with the aforementioned metal slips. This involves not only a heavy expense but is impractical where jars are broken or where the pin is broken off a hard steel bit.

It is, therefore, apparent that it would be highly desirable to have available a thin walled fishing tool which can be used in the lower and relatively smaller portions of the well hole and which at the same time will give consistently satisfactory results.

One of the objects of the present invention, therefore, is to provide a thin-walled fishing tool which is consistently successful in raising lost tools and which does not depend solely upon a frictional grip.

Another object of this invention is the provision of a fishing tool which is capable of being effectively employed in the portions of the well of reduced diameter and which may be readily removed from the retrieved tool without damage to the fishing tool.

A further object of the invention is to provide a thin-walled fishing tool which has a plurality of internal biting edges to engage the lost tools by cutting into them, but which are so arranged that the fishing tool may be readily removed from the retrieved tool without damage to the fishing tool.

A still further and more specific object of the invention is the provision of a thin-walled fishing tool, provided with helically disposed wickers, each wicker being adapted to bite into a lost tool, but the arrangement being such that the fishing tool may be easily and readily removed from the tool retrieved by it.

Other and further objects of the invention will be apparent to those skilled in this particular art or will be pointed out as the description proceeds.

A preferred embodiment of the invention is shown in the accompanying drawings, wherein similar numerals refer to similar parts throughout the several views, and wherein:

Fig. 1 is a vertical elevation of the fishing tool of the present invention.

Fig. 2 is a fragmentary portion of the wall of the fishing tool of Fig. 1 and showing one of the wickers temporarily bent outwardly to receive its facing of biting material.

Fig. 3 is a fragmentary portion of the fishing tool of Fig. 1, showing the faced wicker in final position.

Fig. 4 is a view of Fig. 3 looking substantially from the left thereof.

Fig. 5 is a fragmentary section of the lower portion of the fishing tool showing a number of wickers which are pressed in the wall of the tool and of a somewhat different type from the wickers of the upper portion of the fishing tool, one of the wickers being faced with stellite.

Fig. 6 is a fragmentary portion of the lower portion of the fishing tool of Fig. 1 showing a side view of the pressed wicker faced with biting material, and Fig. 7 is a section on the line 7—7 of Fig. 5.

Referring now to the drawings in detail and in particular to Fig. 1, the numeral 10 indicates the fishing tool proper which consists of a hollow cylindrical portion 11 at the upper end of which are the flattened wrench faces 12. Above the wrench faces, the fishing tool is again of a cylindrical nature as at 13 and at the extreme upper end is provided a tapering exteriorly threaded connection 14 so that the fishing tool may be suitably connected with any desired rod, stem or the like, (not shown) so that the fishing tool may be lowered into the well hole. As is understood in the art, the stem or rod is attached to a cable or rope which may pass up through the derrick and over a pulley in the top thereof, and then down and onto a bull wheel from which the supply of rope or cable is unwound.

In the wall of the hollow cylindrical portion 11 of the fishing tool 10 are formed a number of wickers. The upper set of wickers, which are cut in the wall is designated by the numeral 15 while the lower set of wickers which are integrally pressed from the fishing tool wall is designated by the numeral 16. Each set of wickers or all the wickers as a whole are disposed in helical arrangement progressing upwardly around the wall of the fishing tool and in the particular embodiment of the invention shown eighteen wickers are provided of which nine are of the type 15 and of which the other nine are of the type 16. The wickers are disposed as points of an interrupted screw thread for a purpose which will be explained more clearly hereinafter.

The lower set of wickers of the type 16 is of wedging characteristics in nature of construction. Starting at a point very close to the bottom edge of the fishing tool, this series of wickers extends around the surface of the fishing tool in a helical arrangement and in the form of separated points of an interrupted screw thread.

Referring especially to Fig. 5, it will be observed that looking at the interior surface of the fishing tool, a wicker before being faced, is provided with two generally triangular prominences 20, having their bases 21 at the top. Each triangular prominence 20 rises gradually from the surface of the fishing tool until it reaches its highest and widest point at 22, at which point the wicker recedes sharply back to the surface of the tool, thus forming a relatively sharp edge. Each wicker has two such prominences and there is a groove 23 between them for the reception of facing material. As has already been said, the bases of the triangular prominences are at the top of the wicker and they are inclined, as shown, at screw thread pitch, that is, the bases are at an angle to the horizontal axis of the cylindrical body of the fishing tool so as to form an interrupted screw thread in conjunction with the other wedging wickers. Each of these triangular prominences, particularly adjacent the sharp edge at the highest point, is suitably faced with stellite 19 or some other material which is harder than the material of the tool to be retrieved from the well hole as will be hereinafter more fully explained.

The groove 23, which is longitudinal with respect to a wicker 16, is filled with stellite 19, and join with the stellite 19 already described in connection with the bases of the triangular prominences. The stellite facing is of considerable mass and T-shape (see Fig. 5) as a whole and it is ground substantially flush with the members 20, as shown, and sharp on the corners.

In this way, a lost tool passing up into the fishing tool, will wedge over a surface of stellite so prepared and placed as not to be displaced or sheared away by the wedging action and the groove provides for the reception of sufficient stellite, the original thickness of the wall being, however, preserved by the corresponding ridge on the outside.

In forming this lower series of wickers, a mandrel is inserted into the fishing tool having depressions therein of the exact contours of the wickers to be formed as prominences in the inner-surface of the fishing tool. Suitable dies can be used to co-operate with the mandrel to form said wickers accurately and uniformly.

Taking up now the wickers of the type 15 in detail which are ancillary or supplemental to the wickers of the type 16, it will be seen that at the predetermined points where these wickers are located in the wall of the fishing tool, a longitudinally elongated perforation 17 is made which is incomplete at its lower end so that a tongue portion 18 is produced which extends part way along the perforation leaving at the upper end thereof a space into which a tool can be inserted, as will be explained. The perforations above mentioned are made either by a suitable die cooperating with a suitable mandrel which may be inserted within the fishing tool, or, if desired, the perforations can be drilled or cut out with suitable metal cutting tools, as the fishing tool is itself made of metal such as steel or from forged or hardened metal or alloy thereof. After the perforations and wickers are cut and formed the wickers are heated and then bent outwardly to the necessary amount as illustratively shown in Fig. 2. In such position, a facing or biting material 19 can readily be applied or welded or fused to the corners or edges of the wickers which will form the innermost edges when the wicker is subsequently bent back after being heated again, if necessary, into the position shown in Figs. 3 and 4.

The faced wicker when bent into the position shown in Figs. 3 and 4 presents an upwardly and inwardly projecting biting edge or face adapted to bite into and grip anything coming in contact therewith in the manner to be explained hereinbelow. The preferred facing material is stellite which is a very hard steel alloy and which is harder than the tool steel ordinarily used in the tools to be retrieved. This stellite is preferably welded on by building up a series of thin layers and an exceedingly hard and firm weld can be accomplished. It will be clear that it is preferable to use a facing material which is harder than the material of the tools to be retrieved, as in such case, the biting edge of the wickers will obtain a better grip. This biting facing is applied as explained both to the edges of the wickers 15 and to the highermost portions of the wedging wickers 16.

In operation the fishing tool is suspended from a suitable cable provided with a stem or the like so as to give the necessary weight to force the fishing tool over the end of the tool in the well hole which has been lost and which is to be retrieved. Thus, when the fishing tool is lowered into the well it passes over the end of the tool to be retrieved so that when the fishing tool is raised some or all of the wickers bite into the material of the tool, so as to carry the lost tool along with the fishing tool. The action of the lower series of wickers is partially a resilient one, insofar as the natural spring of the thin wall permits it to be so.

It will be understood that as the fishing tool and the lost tool come into engagement, the wall of the lost tool will tend to force the wall and pressed wickers outwardly. This tendency is slight at first but increases as the tool wall further engages the stellite in the groove. The wickers themselves are tough and the wall somewhat resilient whereas the facing material is hard. Thus the resilient wall and tough wickers tend to resume their first positions and also to oppose the tool wall and in so doing cause the hard facing to bite into and grip or engage the lost tool in a manner not depending on friction and not easily releasable. The wickers and facing are not sheared off or destroyed as prior art wickers are.

The fact that the biting edges of the wickers have been faced with stellite makes the grip deeper and all the stronger. These wickers, as in the case of the wickers 15, extend inwardly and upwardly into the interior of the fishing tool, whereby an excellent grip is secured on the lost tool. In an analogous fashion, the wickers of the type 15 likewise force their innermost portions against the tool to be retrieved and likewise bite into the material of the lost tool so that when the fishing tool is raised the lost tool is additionally engaged. There are thus provided eighteen biting and engaging edges some of which are bound to hold the lost tool sufficiently securely to enable it to be raised to the surface and recovered and the helical disposition of the wickers as a whole aids in the effectiveness of the gripping action because of their offset relationship.

The lost tool or string of tools as the case may be, is thus raised to the surface of the well hole by reversing the direction of operation of the bull wheel so as to wind the cable or cord thereupon. The fishing tool must then be removed from the tool that it is engaging and this may be done in various ways. One preferred manner is to grip the lost tool with a wrench or the like, so that it cannot fall back into the well hole and then any of the spring wickers of the type 15 which are biting into the tool can be loosened by heating their tongues at the point of connection with the fishing tool wall with which it is integral and bending the tongue outwardly into a position similar to that shown in Fig. 2, while in such heated condition. The bending operation can readily be performed by heating the tongue in any desired manner such as by a torch of some kind and then by inserting a tool into the space above the tongue and forcing it outwardly. The inward engaging position is accomplished by a similar heating and by pushing the heated tongue inwardly with a tool. The grip or bite of the lower series of wickers cannot be released in this manner, but as has already been explained they are arranged as separated points of an interrupted screw thread. By applying a wrench or suitable turning tool to the wrench flats 12 mentioned above and by turning the whole fishing tool the latter will unscrew itself from contact with the gripped tool forming its own screw threads at the same time, and thus the function and purpose of the inclined bases of the generally triangular prominences will be clearly understood.

The above is intended to be more illustrative than limitative and many modifications and variations can be made without departing from the spirit and scope of the invention. It is clear, for example, that the precise number of wickers and the sizes thereof as well as their disposition can be changed to suit required or predetermined circumstances, and also that the size of the fishing tool itself is adaptable to meet the size of the well hole from which the lost tools are to be retrieved and the difference in diameter of said tools and said well hole. In addition, however, the facing material for the various wickers can be changed, but it is, of course, preferable to utilize a facing material which is harder than the material of the tool to be gripped. The inclination of the wickers can be altered to vary the pitch of the interrupted screw thread, of which it forms a part, and the relative and absolute dimensions and extensions of the various wickers is subject to considerable variation. All such modifications and other changes not specifically mentioned are deemed to be a part of my invention.

What I claim as new and desire to secure by Letters Patent is:

1. In a tool of the character described, a tough, wedging wicker tapering inwardly and upwardly into the interior of the tool to a point of maximum height and then tapering sharply back toward the inner surface of said tool, thus forming a biting edge, said wicker consisting of two generally triangular prominences, bases upward, with a groove therebetween, said biting edge being disposed at an angle to the horizontal axis of said tool.

2. In a tool of the character described, a tough, wedging wicker tapering inwardly and upwardly into the interior of the tool to a point of maximum height and then tapering sharply back toward the inner surface of said tool, thus forming a biting edge, said wicker consisting of two generally triangular prominences, bases upward, with a groove therebetween, the line of bases being inclined at screw thread pitch.

3. In a fishing tool, a wicker comprising two triangular prominences with a groove therebetween, and a hard metallic facing filling said groove and extending across the tops of said prominences, thereby forming a T-shaped working surface for protecting said prominences and for forming a biting edge for said wicker.

4. In a fishing tool, a wicker comprising two triangular prominences with a groove therebetween, and a hard metallic facing filling said groove and extending across the tops of said prominences, thereby forming a T-shaped surface, said facing being ground substantially flush with said prominences forming a protection therefor and a sharp biting edge at the top thereof.

5. A fishing tool comprising a hollow cylindrical body provided with a set of inwardly extending helically disposed spring wickers and a set of inwardly extending helically disposed triangular shaped wedging wickers having the base at the top thereof, each of said wickers being faced with a hard metallic filling for forming a biting edge thereon, the biting edge of each of said wedging wickers being inclined at screw thread pitch.

6. A fishing tool for retrieving tools from a well comprising a hollow cylindrical body provided with a set of upwardly and inwardly extending helically disposed spring wickers and a set of upwardly and inwardly extending helically disposed triangular shaped wedging wickers having the base at the top thereof, each of said wickers being faced with a material harder than the material of the tools to be retrieved, each of said wedging wickers tapering inwardly from the bottom to the base thereof forming a biting edge therefor, said biting edge being inclined at screw thread pitch.

7. A fishing tool comprising a hollow cylindrical body provided with a set of inwardly extending helically disposed spring wickers and a set of inwardly extending helically disposed wedging wickers below said spring wickers, each of said wedging wickers comprising two triangular shaped prominences having their base at the top and being spaced so as to form a grove therebetween and a hard metallic filling in said groove and extending across the top of said bases for forming a biting edge for said wicker, said biting edge being disposed at an angle to the horizontal axis of said tool so as to form an interrupted screw thread on the interior of said cylindrical body in conjunction with the biting edge on the other wickers.

8. A fishing tool for retrieving tools from a well comprising a hollow cylindrical body provided with a set of helically disposed spring wickers formed integral therewith and extending inwardly and upwardly from the interior thereof and a set of helically disposed wedging wickers below said spring wickers extending upwardly and inwardly from the inner surface of said cylindrical body, each of said wedging wickers comprising two triangular prominences each of which has the base at the top and which are spaced apart so as to form a groove therebetween and a hard facing metal in said groove and extending across the bases of said prominences for protecting said prominences and for forming a biting edge along the top thereof, said biting edge being inclined at screw thread pitch.

In testimony whereof, I have hereunto subscribed my name this 3rd day of December, 1929.

VERNE MONROE.